(12) United States Patent
Hasegawa et al.

(10) Patent No.: US 11,718,350 B2
(45) Date of Patent: Aug. 8, 2023

(54) VEHICLE BODY SIDE STRUCTURE

(71) Applicant: HONDA MOTOR CO., LTD., Tokyo (JP)

(72) Inventors: Atsushi Hasegawa, Wako (JP); Hitomi Yamada, Wako (JP); Ryotaro Takeuchi, Wako (JP); Takayuki Fujii, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 37 days.

(21) Appl. No.: 17/680,429

(22) Filed: Feb. 25, 2022

(65) Prior Publication Data

US 2022/0315118 A1 Oct. 6, 2022

(30) Foreign Application Priority Data

Mar. 30, 2021 (JP) ................. 2021-057198

(51) Int. Cl.
*B62D 25/04* (2006.01)
*B62D 25/02* (2006.01)
*B62D 21/15* (2006.01)
*B62D 27/02* (2006.01)

(52) U.S. Cl.
CPC ......... *B62D 25/025* (2013.01); *B62D 21/157* (2013.01); *B62D 27/023* (2013.01); *B62D 25/04* (2013.01)

(58) Field of Classification Search
CPC ...... B62D 25/04; B62D 25/025; B62D 21/15; B62D 21/157; B62D 27/023
USPC ................... 296/193.06, 209, 29, 30, 187.12
See application file for complete search history.

(56) References Cited

U.S. PATENT DOCUMENTS

| | | | | |
|---|---|---|---|---|
| 5,397,152 A | * | 3/1995 | Kawamura | ............. B60R 22/24 280/808 |
| 6,332,643 B1 | * | 12/2001 | Sukegawa | ............. B62D 25/04 296/193.06 |
| 9,580,110 B2 | * | 2/2017 | Imada | .................... B62D 25/00 |

FOREIGN PATENT DOCUMENTS

JP 2005-199749 7/2005

* cited by examiner

*Primary Examiner* — Dennis H Pedder
(74) *Attorney, Agent, or Firm* — Amin, Turocy & Watson, LLP

(57) ABSTRACT

This vehicle body side structure includes: side sills provided at both end portions of a floor section in a width direction of a vehicle and extending in a forward/rearward direction of the vehicle; a pillar extending upward from each of the side sills and having a pillar outer provided on an outside in the width direction of the vehicle; a crushing member provided on an inside in the width direction of the vehicle with respect to the pillar outer, having a lower portion joined to the side sill, and extending upward; an impactor which is provided above the crushing member, which is joined to an inside of the pillar outer in the width direction of the vehicle, and in which the impactor and the crushing member at least partially overlap in an upward/downward direction; and a seatbelt winding device provided on the outside in the width direction of the vehicle with respect to the crushing member and disposed inside an accommodation concave section formed in the impactor.

10 Claims, 5 Drawing Sheets

VEHICLE BODY SIDE STRUCTURE

CROSS-REFERENCE TO RELATED APPLICATION

The present application claims priority based on Japanese Patent Application No. 2021-057198, filed Mar. 30, 2021, the content of which is incorporated herein by reference.

BACKGROUND OF THE INVENTION

Field of the Invention

The present invention relates to a vehicle body side structure.

Description of Related Art

In order to protect the occupants in vehicle interiors in the events of vehicle collisions or the like, various vehicle body side structures capable of absorbing collision loads due to external forces have been proposed. As such vehicle body side structures, for example, there are vehicle body side structures configured to prevent a center pillar from entering a vehicle interior due to a collision load input from a side of a vehicle.

For example, in Japanese Unexamined Patent Application, First Publication No. 2005-199749, a constitution in which, when an intermediate portion with respect to upper and lower end portions of a pillar is formed into a curved shape in which the intermediate portion is convex outward in a width direction of a vehicle, a side collision input acting in a substantially horizontal direction from the outside toward the inside of a vehicle is converted into an input in an upward/downward direction and sustained is disclosed. In such a constitution, when the pillar is compressed and deforms in the upward/downward direction, the pillar absorbs a collision load input from the side of the vehicle. Furthermore, this pillar includes upper and lower deformation allowable sections provided at the upper and lower end portions of the pillar and an intermediate deformation allowable section provided at an intermediate portion of the pillar in the upward/downward direction and has a deformation strength of each of the deformation allowable sections set to be smaller than crushing strengths of other portions of the pillar in an axial direction. With such a constitution, at an initial stage of a collision, an attempt is being made to hold the pillar, which deforms inward in the width direction of the vehicle due to a side collision input acting in a substantially horizontal direction from the outside toward the inside of the vehicle, in a shape in a substantially straight line state.

SUMMARY OF THE INVENTION

However, in the constitution disclosed in Japanese Unexamined Patent Application, First Publication No. 2005-199749, the deformation of the pillar to some extent is required until the pillar is compressed and deforms to effectively absorb a collision load. That is to say, it is conceivable that the pillar and a seatbelt winding device provided at the base of the pillar enter a vehicle interior due to the deformation of the pillar until the collision load is effectively absorbed.

An object of an aspect of the present invention is to provide a vehicle body side structure capable of effectively absorbing a collision load while minimizing deformation of a pillar.

In order to achieve the above object, a vehicle body side structure according to an aspect of the present invention adopts the following constitution.

(1) An aspect of the present invention includes: side sills (for example, side sills 2 in an embodiment) provided at both end portions of a floor section (for example, a floor section 11 in the embodiment) in a width direction of a vehicle and extending in a forward/rearward direction of the vehicle; a pillar (for example, a center pillar 4 in the embodiment) extending upward from each of the side sills and having a pillar outer (for example, a pillar outer 41 in the embodiment) provided on an outside in the width direction of the vehicle; a crushing member (for example, a crushing member 51 in the embodiment) provided on an inside in the width direction of the vehicle with respect to the pillar outer, having a lower portion joined to the side sill, and extending upward; an impactor (for example, an impactor 52 in the embodiment) which is provided above the crushing member, which is joined to an inside of the pillar outer in the width direction of the vehicle, and in which the impactor and the crushing member at least partially overlap in an upward/downward direction; and a seatbelt winding device (for example, a winding device 100 in the embodiment) provided on the outside in the width direction of the vehicle with respect to the crushing member and disposed inside an accommodation concave section (for example, an accommodation concave section 52q in the embodiment) formed in the impactor.

According to the aspect of the above (1), when the crushing member whose lower portion is joined to the side sills and the impactor provided above the crushing member and joined to the inside of the pillar outer in the width direction of the vehicle are connected to at least partially overlap in the upward/downward direction, in the case in which a collision load is input from the side of the vehicle, as the pillar deforms, the impactor is displaced to collapse inward and downward in the width direction of the vehicle. Thus, the impactor causes the crushing member to be pressed inward and downward in the width direction of the vehicle and thus the crushing member can be actively crushed. In this way, when the impactor causes the crushing member to be effectively crushed, it is possible to absorb the energy due to the collision load input to the pillar. Therefore, it is possible to minimize an amount of deformation of the pillar and it is possible to prevent the pillar and the seatbelt winding device from entering the vehicle interior.

Also, when the winding device is disposed inside the accommodation concave section, the impactor allows the winding device to be protected. Furthermore, when the winding device is displaced together with the impactor, it is possible to utilize the winding device for crushing the crushing member.

Thus, it is possible to effectively absorb a collision load while minimizing the deformation of the pillar.

(2) In an aspect of the above (1), the impactor may include an upper wall (for example, an upper wall 52a in the embodiment) fixed to the pillar outer, a pair of upper side walls (for example, upper side walls 52b in the embodiment) extending inward in the width direction of the vehicle from both end portions of the upper wall in the forward/rearward direction of the vehicle, and an upper bottom wall (for example, an upper bottom wall 52d in the embodiment) configured to close below the pair of upper side walls, and may be opened inward in the width direction of the vehicle, the crushing member may include a lower wall (for example, a lower wall 51a in the embodiment) disposed at a distance inward in the width direction of the vehicle with respect to the pillar outer, and a pair of lower side walls (for example, lower side walls 51b in the embodiment) extending outward in the width direction of the vehicle from both sides of the lower wall in the forward/rearward direction of the vehicle, and may be opened outward in the width direction of the vehicle, and the pair of upper side walls and the pair of lower side walls may be joined.

According to the aspect of the above (2), the impactor forms the accommodation concave section which is formed of the upper wall and the pair of upper side walls and upper bottom wall and opened only inside in the width direction of the vehicle. Thus, it is possible to increase the strength of the impactor and efficiently crush the crushing member.

Also, the crushing member forms a concave portion which is formed of the lower wall and the pair of lower side walls and opened outward in the width direction of the vehicle. Thus, when a collision load is input from the side of the vehicle, it is possible to prevent the winding device from falling off from the side sills.

(3) In an aspect of the above (2), each of the lower side walls may include a lower inclined section (for example, a lower inclined section 51s in the embodiment) inclined upward from the outside toward the inside in the width direction of the vehicle, and the upper side wall may include an upper inclined section (for example, an upper inclined section 52s in the embodiment) inclined upward from the outside toward the inside in the width direction of the vehicle and connected to the lower inclined section.

According to the aspect of the above (3), the upper inclined section of the impactor and the lower inclined section of the crushing member are inclined upward from the outside toward the inside in the width direction of the vehicle. For this reason, when a collision load is input from the side of the vehicle, if the crushing member is pressed by the impactor displaced inward in the width direction of the vehicle together with the pillar, a reaction force received by the upper inclined section from the lower inclined section makes it easy for the impactor to deform and collapse inward and downward in the width direction of the vehicle from the upper inclined section as a starting point. Thus, the impactor allows the crushing member to be efficiently crushed. Therefore, it is possible to efficiently minimize an amount of deformation of the pillar by more effectively absorbing energy due to a collision load input to the pillar.

(4) In an aspect of the above (2) or (3), the impactor may include reinforcing sections (for example, beads 52r in the embodiment) which are continuous from the upper wall to the pair of upper side walls on both sides in the forward/rearward direction of the vehicle.

According to the aspect of the above (4), it is possible to increase the strength of the impactor using the reinforcing sections. Thus, the impactor allows the crushing member to be efficiently crushed. Therefore, it is possible to efficiently minimize an amount of deformation of the pillar by more effectively absorbing energy due to a collision load input to the pillar.

(5) In an aspect of any one of the above (1) to (4), the crushing member may be joined to an inner surface (for example, an inner surface 2s in the width direction of a vehicle in the embodiment) in the width direction of the vehicle and an upper surface (for example, an upper surface 2t in the embodiment) of the side sill.

According to the aspect of the above (5), the crushing member is joined to the firm side sills. Thus, when a collision load is input from the side of the vehicle, if the crushing member is pressed by the impactor displaced inward in the width direction of the vehicle together with the pillar, the upper portion of the crushing member easily deforms to collapse inward and downward in the width direction of the vehicle while preventing the lower portion of the crushing member from collapsing. Therefore, it is possible to efficiently minimize an amount of deformation of the pillar by more effectively absorbing energy due to a collision load input to the pillar.

(6) In an aspect of any one of the above (1) to (5), the pillar may further include a pillar inner (for example, a pillar inner 42 in the embodiment) provided inward in the width direction of the vehicle with respect to the pillar outer and having a lower end portion with an opening (for example, an opening 42k in the embodiment) therein, and the crushing member may be disposed below the opening and inward in the width direction of the vehicle.

According to the aspect of the above (6), when the crushing member is disposed further inward in the width direction of the vehicle than the pillar inner, it is possible to efficiently crush the crushing member using the impactor displaced inward in the width direction of the vehicle together with the pillar.

(7) An aspect of any one of the above (1) to (6) may further include: a partition wall (for example, a partition wall 55 in the embodiment) provided inside the side sill and at a position in which the partition wall and the crushing member overlap in the forward/rearward direction of the vehicle along a surface of the side sill which intersects the partition wall in the forward/rearward direction of the vehicle.

According to the aspect of the above (7), the partition wall allows the strength of the side sills in a portion in which the crushing member is provided to be increased. Thus, in the case in which a collision load is input from the side of the vehicle, when the crushing member is pressed by the impactor displaced inward in the width direction of the vehicle together with the pillar, the upper portion of the crushing member easily deforms to collapse inward and downward in the width direction of the vehicle while preventing the lower portion of the crushing member from collapsing. Therefore, it is possible to efficiently minimize an amount of deformation of the pillar by more effectively absorbing energy due to a collision load input to the pillar.

(8) An aspect of any one of the above (1) to (7) may further include: a door beam (for example, a front door beam 65 and a rear door beam 75 in the embodiment) provided in a door (for example, a front door 61 and a rear door 71 in the embodiment) provided in a door opening (for example, a front door opening 6 and a rear door opening 7 in the embodiment) formed on at least one side in the forward/rearward direction of the vehicle to be openable and closeable with respect to the pillar and provided to straddle the door opening in the forward/rearward direction of the vehicle with the door opening closed, and a beam end (for example, beam ends 65e and 75e in the embodiment) of the door beam may be disposed at a position in which the beam end and the impactor overlap in the upward/downward direction.

According to the aspect of the above (8), when the impactor and the end portion of the door beam on the pillar side are disposed at positions in which the impactor and the end portion of the door beam on the pillar side overlap in the upward/downward direction, in the case in which a collision load is input from the side of the vehicle, it is possible to efficiently transmit a force transmitted from the door side to the pillar to the impactor. Therefore, it is possible to actively crush the crushing member using the impactor. Thus, it is possible to efficiently minimize an amount of deformation of the pillar by more effectively absorbing energy due to a collision load input to the pillar.

(9) In an aspect of any one of the above (1) to (8), the impactor may have a rigidity higher than that of the crushing member.

According to the aspect of the above (9), when a collision load is input from the side of the vehicle, it is possible to efficiently crush the crushing member using the impactor having high rigidity. Thus, it is possible to efficiently minimize an amount of deformation of the pillar by more effectively absorbing energy due to a collision load input to the pillar.

(10) In an aspect of the above (9), the impactor may be made of a material having a sheet thickness larger than that of the crushing member.

According to the aspect of the above (10), when the impactor is formed of a material having a sheet thickness thicker than that of the crushing member, the impactor has rigidity higher than that of the crushing member. Thus, when a collision load is input from the side of the vehicle, the impactor having high rigidity allows the crushing member to be efficiently crushed. Therefore, it is possible to efficiently minimize an amount of deformation of the pillar by more effectively absorbing energy due to a collision load input to the pillar.

According to an aspect of the present invention, a collision load is effectively absorbed while minimizing the deformation of a pillar.

DESCRIPTION OF EMBODIMENTS

An embodiment of the present invention will be described below with reference to the drawings. In the following description, directions such as a forward direction, a rearward direction, an upward direction, a downward direction, a leftward direction, and a rightward direction are the same as directions when a vehicle travels unless otherwise stated.

Figure 1:
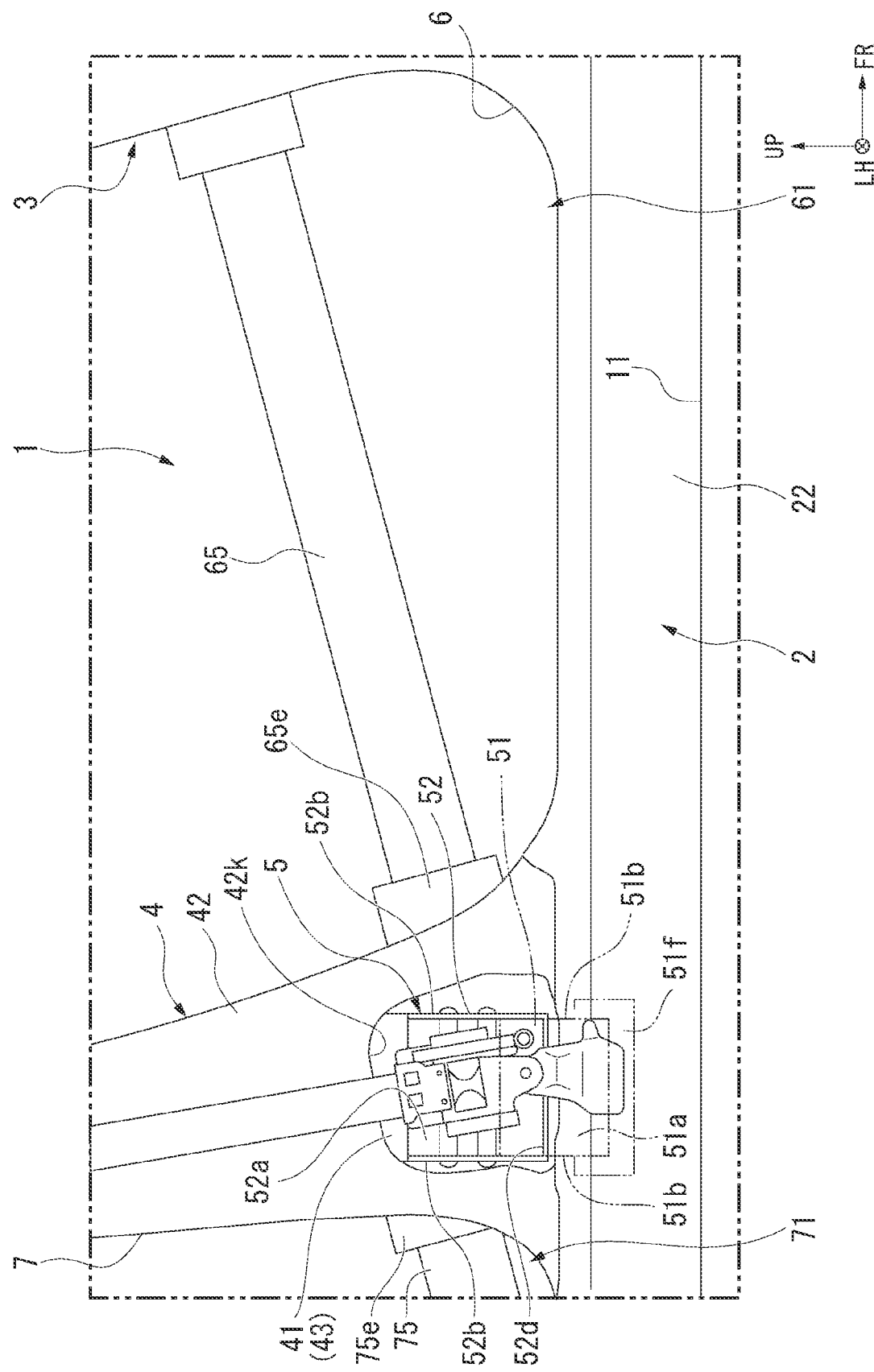
FIG. 1 is a diagram of a vehicle body side structure when viewed from the inside in a width direction of a vehicle.

FIG. 1 is a diagram of a vehicle body side structure 1 when viewed from the inside in a width direction of the vehicle.

As shown in FIG. 1, the vehicle body side structure 1 mainly includes side sills 2, a front pillar 3, center pillars 4, and a crushing section 5.

Figure 2:
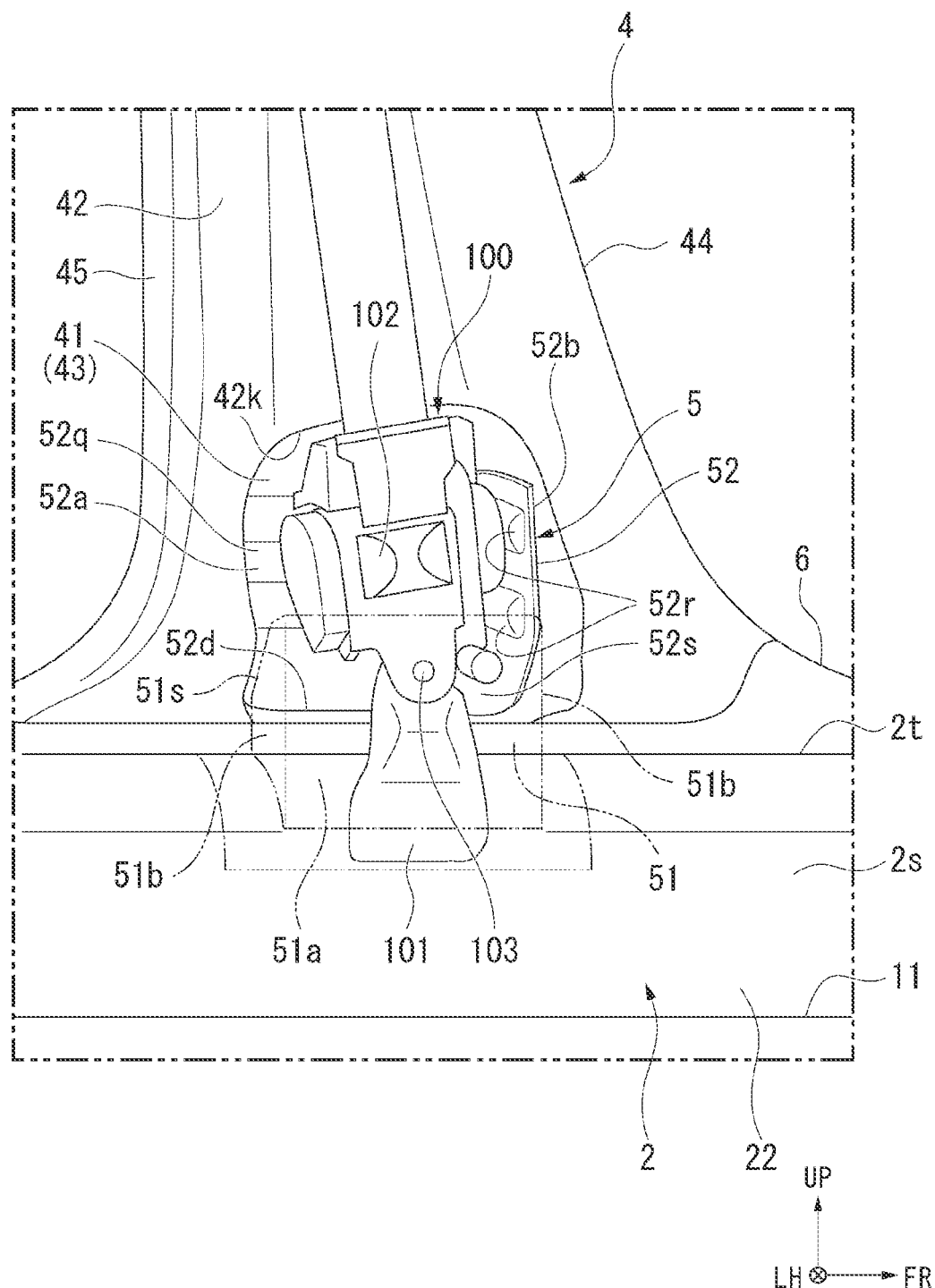
FIG. 2 is an enlarged diagram showing a main part of FIG. 1.
Figure 3:
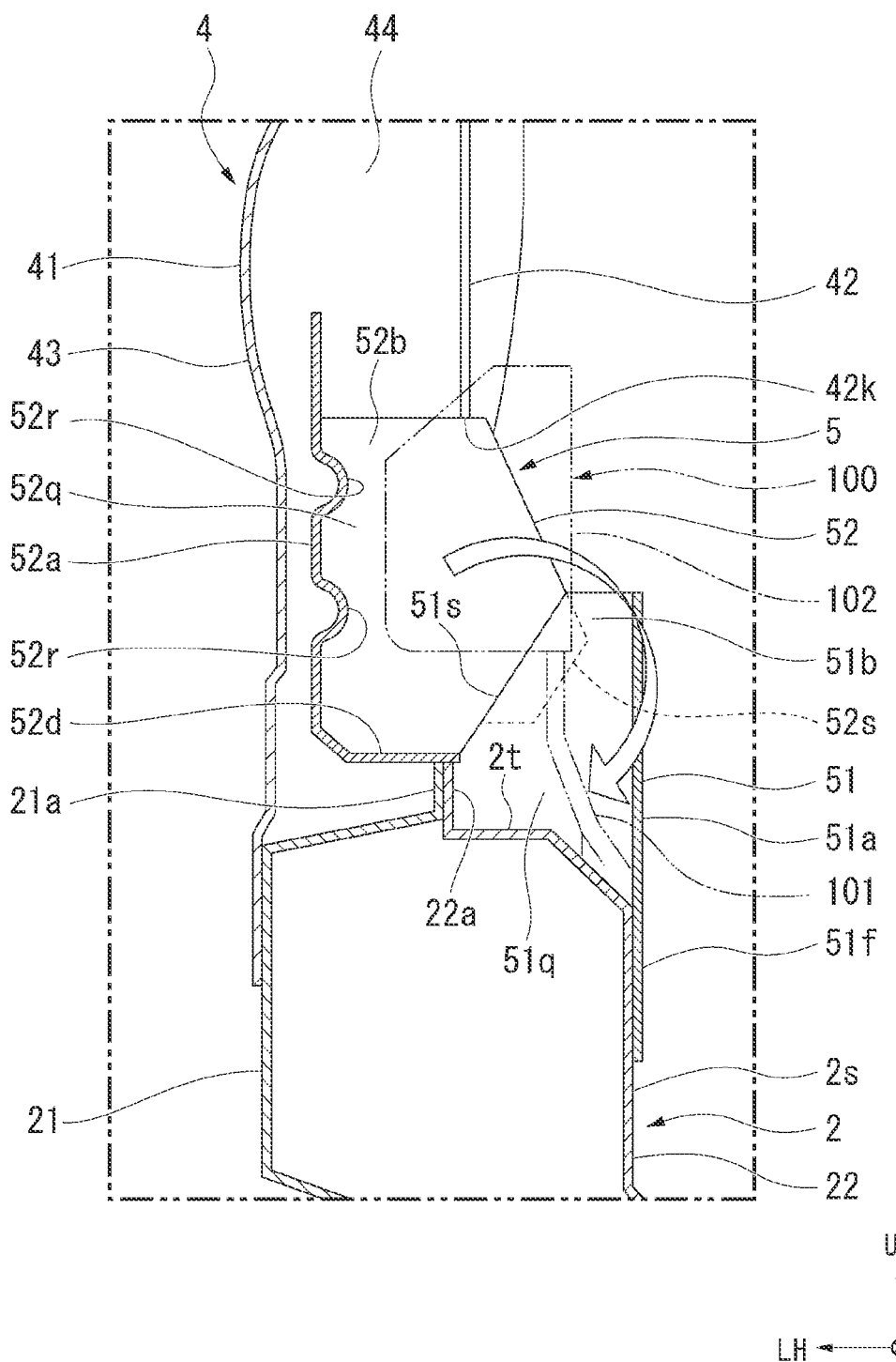
FIG. 3 is a perspective view showing a crushing member and an impactor provided in the vehicle body side structure.

FIG. 2 is an enlarged diagram showing a main part of FIG. 1. FIG. 3 is a cross-sectional view showing a crushing member 51 and an impactor 52 provided in the vehicle body side structure 1.

The side sills 2 are provided at both end portions of a floor section 11 of a lower portion of a vehicle body in the width direction of the vehicle. The side sills 2 are formed in a closed cross section extending in a forward/rearward direction of the vehicle. As shown in FIGS. 2 and 3, each of the side sills 2 includes a side sill outer panel 21 (refer to FIG. 3) and a side sill inner panel 22. The side sill outer panel 21 is formed to have a hat-shaped cross section in which the side sill outer panel 21 has an upper flange 21a and a lower flange (not shown). The side sill inner panel 22 is formed to have a hat-shaped cross section in which the side sill inner panel 22 has an upper flange 22a and a lower flange (not shown). In the side sill outer panel 21 and the side sill inner panel 22, the side sill 2 is formed to have a closed cross section by joining the upper flanges 21a and 22a and the lower flanges (not shown). The side sill 2 is a highly rigid member which forms a vehicle body skeleton on a side of the lower portion of the vehicle body.

As shown in FIG. 1, the front pillar 3 extends upward from a front end portion of the side sill 2. Each of the center pillars 4 extends upward from a central portion of the side sill 2 in the forward/rearward direction of the vehicle. Furthermore, a quarter pillar (not shown) extends upward from a rear end portion of the side sill 2. A roof side rail (not shown) extending in the forward/rearward direction of the vehicle is fixed to an upper end portion of the front pillar 3, an upper end portion of the center pillar 4, and an upper end portion of the quarter pillar (not shown).

The side sill 2, the front pillar 3, the center pillar 4, the quarter pillar (not shown), the roof side rail (not shown), and the like are covered with a side panel outer (not shown) from the outside in the width direction of the vehicle. The side panel outer is a panel which forms a design surface on an outer side in the width direction of the vehicle.

As shown in FIGS. 2 and 3, the center pillar 4 includes a pillar outer 41 and a pillar inner 42. The pillar outer 41 is provided on an outer side of the center pillar 4 in the width direction of the vehicle. The pillar outer 41 stands up on the outside in the width direction of the vehicle from a center of the side sill 2 in the forward/rearward direction of the vehicle to the roof side rail (not shown). The pillar outer 41 has an outer side wall 43 disposed on the outside in the width direction of the vehicle, an outer front flange 44 bent inward in the width direction of the vehicle from a front side of the outer side wall 43, and an outer rear flange 45 (refer to FIG. 2) bent inward in the width direction of the vehicle from a rear side of the outer side wall 43.

The pillar inner 42 is provided inside the center pillar 4 in the width direction of the vehicle. The pillar inner 42 is provided to cover the pillar outer 41 from the inside in the width direction of the vehicle. An opening 42k is formed in a lower portion of the pillar inner 42. The outer front flange 44 and the outer rear flange 45 of the pillar outer 41 and an inner front flange (not shown) and an inner rear flange (not shown) of the pillar inner 42 are coupled through, for example, spot welding. Thus, the center pillar 4 is formed to have a closed cross section extending in the upward/downward direction.

As shown in FIG. 1, a front door opening 6 is defined in front of the center pillar 4 to be surrounded by the side sill 2, the front pillar 3, the center pillar 4, and a roof ride rail (not shown). A front door 61 is provided in the front door opening 6 to be openable and closeable. The front door 61 is rotatably connected to the front pillar 3 via a hinge (not shown).

A rear door opening 7 is defined behind the center pillar 4 to be surrounded by the side sill 2, the center pillar 4, the quarter pillar (not shown), and the roof ride rail (not shown). A rear door 71 is provided in the rear door opening 7 to be openable and closeable. The rear door 71 is rotatably connected to the center pillar 4 via the hinge (not shown).

Figure 4:
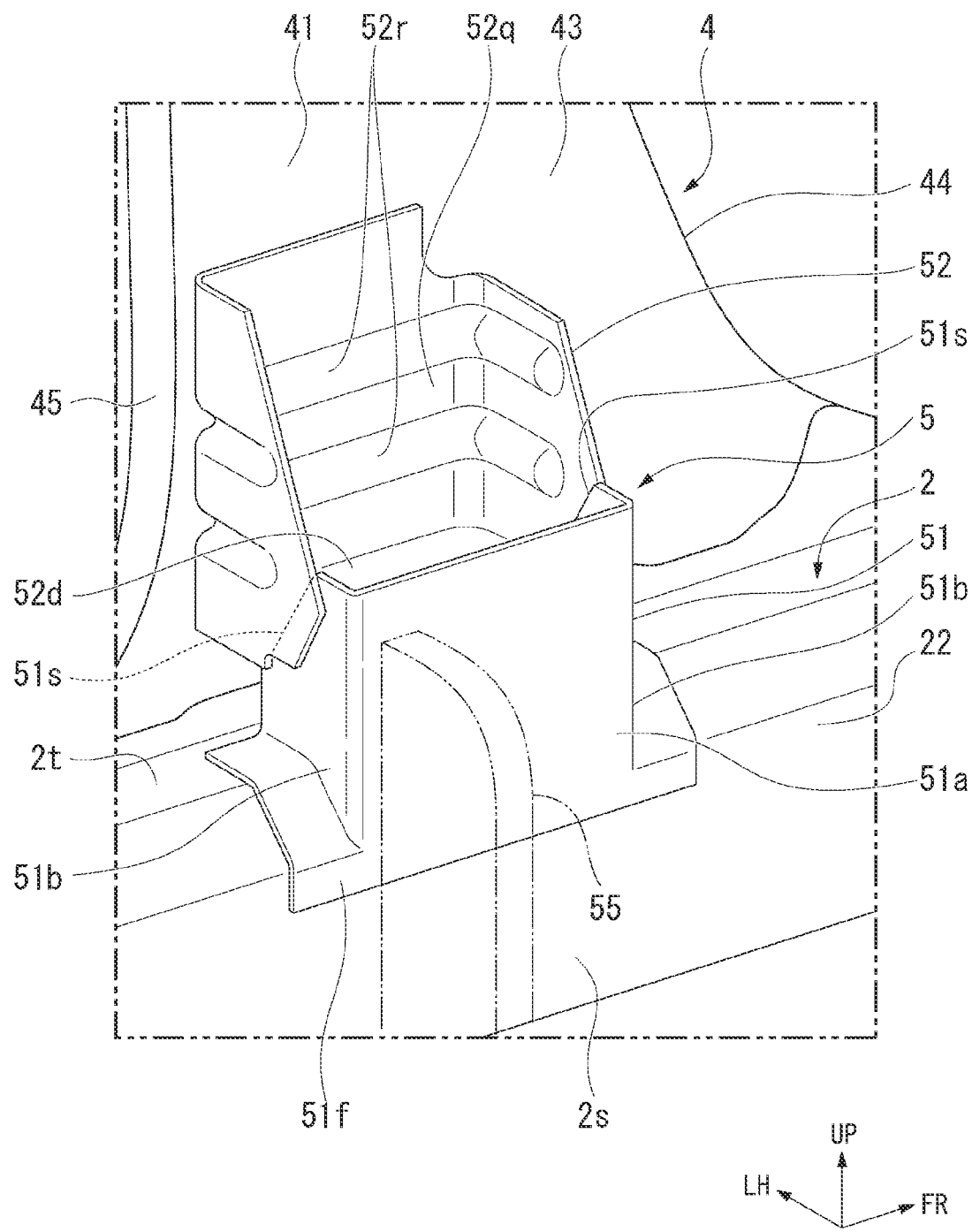
FIG. 4 is a perspective view showing the crushing member and the impactor provided in the vehicle body side structure.

FIG. 4 is a perspective view showing the crushing member 51 and the impactor 52 provided in the vehicle body side structure 1.

As shown in FIGS. 2 to 4, the crushing section 5 includes the crushing member 51 and the impactor 52.

The crushing member 51 is provided on the inside in the width direction of the vehicle with respect to the pillar outer 41. A lower portion of the crushing member 51 is joined to the side sill 2. The crushing member 51 extends upward from the side sill 2. The crushing member 51 is integrally formed with a lower wall 51a, a pair of lower side walls 51b, a lower inclined section 51s, and a lower flange 51f.

The lower wall 51a is disposed at a distance inward in the width direction of the vehicle with respect to the outer side wall 43 of the pillar outer 41. The pair of lower side walls 51b extend inward in the width direction of the vehicle from both sides of the lower wall 51a in the forward/rearward direction of the vehicle. The crushing member 51 has a concave portion 51q which is opened outward in the width direction of the vehicle using the lower wall 51a and the pair of lower side walls 51b.

Upper ends of the pair of lower side walls 51b are inclined upward from the outside toward the inside in the width direction of the vehicle. Thus, the lower inclined section 51s inclined upward from the outside toward the inside in the width direction of the vehicle is formed on an upper portion of the crushing member 51.

The lower flange 51f extends to spread from a lower end of the crushing member 51 along an inner surface 2s in the width direction of the vehicle and an upper surface 2t of the side sill 2 (the side sill outer panel 21). The lower flange 51f is joined to the inner surface 2s in the width direction of the vehicle and the upper surface 2t of the side sill 2 through, for example, spot welding. Thus, a lower portion of the crushing member 51 is joined to the side sill 2.

Such a crushing member 51 is disposed below the opening 42k and inward in the width direction of the vehicle. That is to say, the crushing member 51 is exposed further inward in the width direction of the vehicle than the pillar inner 42.

The impactor 52 is provided above the crushing member 51. The impactor 52 is joined to an inner surface of the pillar outer 41. The impactor 52 integrally includes an upper wall 52a, a pair of upper side walls 52b, an upper bottom wall 52d, and an upper inclined section 52s.

The upper wall 52a is joined to an inner surface of the outer side wall 43 of the pillar outer 41 facing inward in the width direction of the vehicle through spot welding or the like. The pair of upper side walls 52b extend inward in the width direction of the vehicle from end portions of the upper wall 52a on both sides thereof in the forward/rearward direction of the vehicle. The upper bottom wall 52d closes below the pair of upper side walls 52b. The impactor 52 includes the upper wall 52a, the pair of upper side walls 52b, and the upper bottom wall 52d which is opened only inward in the width direction of the vehicle through the upper bottom wall 52d.

The impactor 52 includes beads (reinforcing sections) 52r which are continuous in a horizontal direction from the upper wall 52a toward the pair of upper side walls 52b. In the embodiment, for example, the two beads 52r are provided at intervals in the upward/downward direction.

The upper inclined section 52s inclined upward from the outside toward the inside in the width direction of the vehicle is formed on each of the pair of upper side walls 52b.

The lower inclined section 51s of the crushing member 51 is inserted into the upper inclined section 52s of the impactor 52. Thus, the impactor 52 and the crushing member 51 at least partially overlap in the upward/downward direction. The upper inclined section 52s is joined to the lower inclined section 51s through, for example, spot welding. The crushing member 51 and the impactor 52 may be connected through bolts or the like.

The crushing member 51 and the impactor 52 are formed into a prescribed shape by pressing a metal sheet material. In the embodiment, a sheet thickness of a metal sheet material forming the impactor 52 is larger than a sheet thickness of a metal sheet material forming the crushing member 51. Thus, the impactor 52 has strength and rigidity higher than those of the crushing member 51. The impactor 52 may have strength and rigidity higher than those of the crushing member 51 through a method other than a sheet thickness.

As shown in FIGS. 2 and 3, a seatbelt winding device 100 (so-called emergency locking retractor: ELR) is disposed between the crushing member 51 and the impactor 52 as described above. The winding device 100 includes an anchor member 101 and a winding device main body 102. A lower portion of the anchor member 101 is disposed between the crushing member 51 and the side sill 2. The anchor member 101 is attached to the side sill 2 through welding.

The winding device main body 102 is attached to the anchor member 101 via an anchor pin 103 and is attached to the side sill 2. The winding device main body 102 is disposed inside the accommodation concave section 52q of the impactor 52.

Also, as shown in FIG. 1, a front door beam 65 provided to straddle the front door opening 6 in the forward/rearward direction of the vehicle is provided in the front door 61 provided to the front door opening 6 formed in front of the center pillar 4 to be openable and closeable. The front door beam 65 is provided to straddle the front door opening 6 in a state in which the front door opening 6 is closed by the front door 61. A beam end 65e of the front door beam 65 is disposed in front of the center pillar 4 and at a position in which the beam end 65e and the impactor 52 overlap in the upward/downward direction.

Furthermore, a beam end 75e of a rear door beam 75 provided to straddle the rear door opening 7 is provided behind the center pillar 4 and at a position in which the beam end 75e and the impactor 52 overlap in the upward/downward direction. The beam ends 65e and 75e and the impactor 52 may at least partially overlap in the upward/downward direction.

Figure 5:
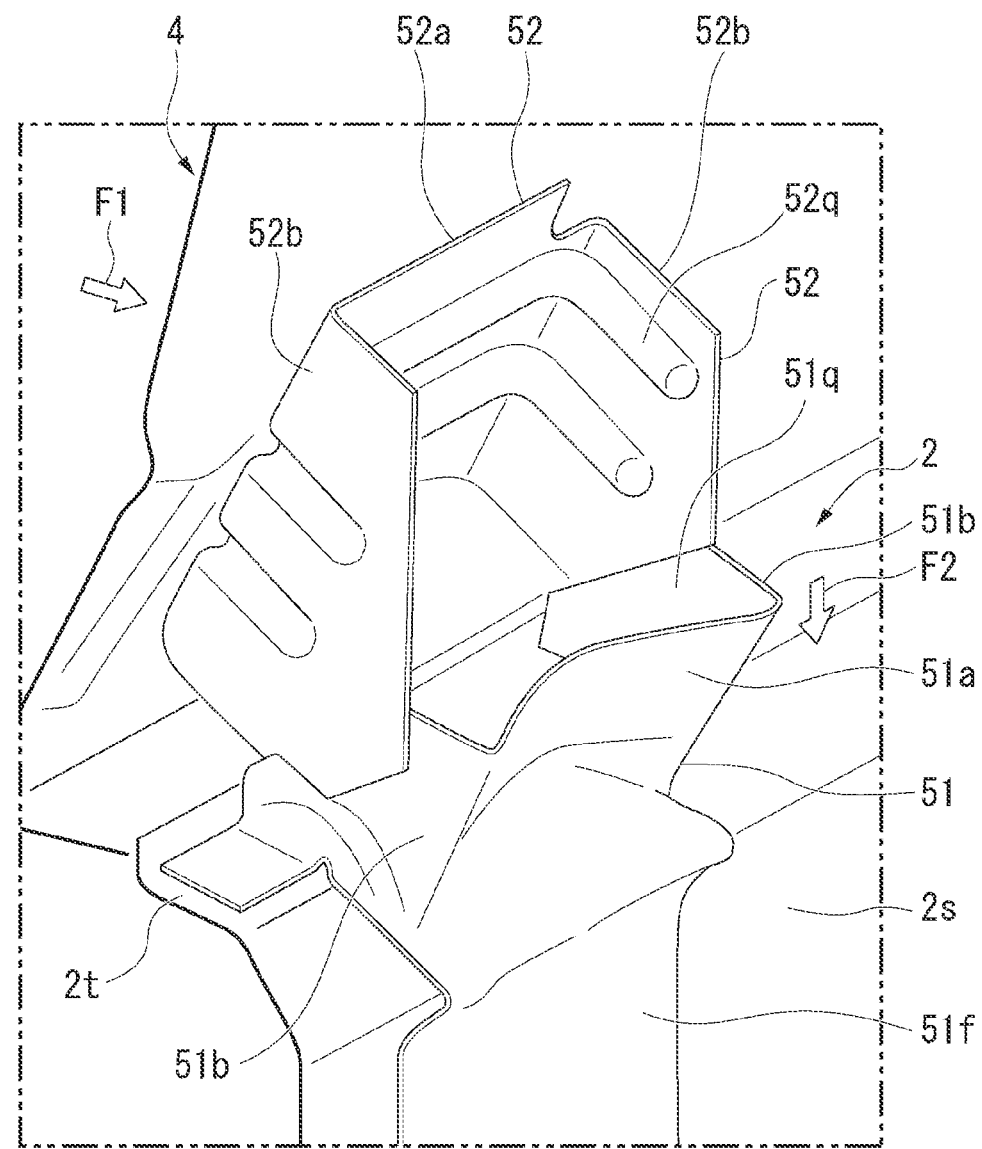
FIG. 5 is a perspective view showing a state in which the crushing member deforms due to an impact load from a side of a vehicle body.
Figure 5:
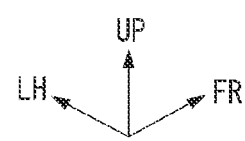

FIG. 5 is a perspective view showing a state in which the crushing member 51 deforms due to an impact load from the side of the vehicle body.

As shown in FIG. 5, in the crushing section 5 as described above, when a force F1 due to a collision load is input from the side of the vehicle, the center pillar 4 deforms to be pushed inward in the width direction of the vehicle. Thus, as the center pillar 4 deforms, the entire impactor 52 collapses inward and downward in the width direction of the vehicle. Thus, a force F2 which presses the lower inclined section 51s downward from the upper inclined section 52s of the impactor 52 acts. Through this force F2, a portion of the crushing member 51 to which the impactor 52 is connected is pressed inward and downward in the width direction of the vehicle and the upper portion of the crushing member 51 is crushed. In this way, when the crushing member 51 is effectively crushed using the impactor 52, energy due to a collision load input to the center pillar 4 is absorbed.

In this way, in the embodiment, the vehicle body side structure 1 includes the side sills 2 provided at both end portions of the floor section 11 in the width direction of the vehicle and extending in the forward/rearward direction of the vehicle, the center pillar 4 extending upward from each of the side sills 2 and having the pillar outer 41 provided outward in the width direction of the vehicle, the crushing member 51 provided inward in the width direction of the vehicle with respect to the pillar outer 41 and having the lower portion joined to the side sill 2 and extending above the side sill 2, the impactor 52 provided above the crushing member 51, joined to the inside of the pillar outer 41 in the width direction of the vehicle, and configured so that the impactor 52 and the crushing member 51 at least partially overlap in the upward/downward direction, and the seatbelt winding device 100 provided outward in the width direction of the vehicle with respect to the crushing member 51 and including the anchor member 101 fixed to the side sill 2 and the winding device main body 102 disposed inside the accommodation concave section 52q formed in the impactor 52.

According to this constitution, when the crushing member 51 whose lower portion is joined to the side sill 2 and the impactor 52 provided above the crushing member 51 and joined to the inside of the pillar outer 41 in the width direction of the vehicle at least partially overlap in the upward/downward direction, in the case in which a collision load is input from the side of the vehicle, as the center pillar 4 deforms, the impactor 52 is displaced to collapse inward and downward in the width direction of the vehicle. Thus, the crushing member 51 is pressed inward and downward in the width direction of the vehicle using the impactor 52 and the crushing member 51 can be actively crushed. When the crushing member 51 is effectively crushed using the impactor 52 in this way, it is possible to absorb energy due to a collision load input to the center pillar 4. Therefore, it is possible to minimize an amount of deformation of the center pillar 4 and it is possible to prevent the center pillar 4 and the seatbelt winding device 100 from entering the vehicle interior.

Also, when the winding device 100 is disposed inside the accommodation concave section 52q, it is possible to protect the winding device 100 using the impactor 52. Furthermore, when the winding device 100 is displaced together with the impactor 52, it is possible to use the winding device 100 for crushing the crushing member 51.

Thus, it is possible to effectively absorb a collision load while minimizing the deformation of the center pillar 4.

In the embodiment, the impactor 52 includes the upper wall 52a fixed to the pillar outer 41, the pair of upper side walls 52b extending inward in the width direction of the vehicle from the upper wall 52a in the forward/rearward direction of the vehicle, and the upper bottom wall 52d configured to close below the pair of upper side walls 52b and is opened inward in the width direction of the vehicle, the crushing member 51 includes the lower wall 51a disposed at a distance inward in the width direction of the vehicle with respect to the pillar outer 41 and the pair of lower side walls 51b extending outward in the width direction of the vehicle from both sides of the lower wall 51a in the forward/rearward direction of the vehicle and is opened outward in the width direction of the vehicle, and the pair of upper side walls 52b and the pair of lower side walls 51b are joined.

According to this constitution, in the impactor 52, the accommodation concave section 52q which is opened inward in the width direction of the vehicle is formed using the upper wall 52a, the pair of upper side walls 52b, the upper bottom wall 52d. Thus, it is possible to increases the strength of the impactor 52 and to efficiently crush the crushing member 51.

Also, in the crushing member 51, the concave portion 51q which is opened outward in the width direction of the vehicle is formed using the lower wall 51a and the pair of lower side walls 51b. Thus, when a collision load is input from the side of the vehicle, it is possible to prevent the winding device 100 from falling off from the side sill 2.

In the embodiment, each of the lower side walls 51b includes the lower inclined section 51s inclined upward from the outside toward the inside in the width direction of the vehicle and the upper side wall 52b includes the upper inclined section 52s inclined upward from the outside toward the inside in the width direction of the vehicle and connected to the lower inclined section 51s.

According to this constitution, the upper inclined section 52s of the impactor 52 and the lower inclined section 51s of the crushing member 51 are inclined upward from the outside toward the inside in the width direction of the vehicle. For this reason, when a collision load is input from the side of the vehicle, if the crushing member is pressed by the impactor 52 displaced inward in the width direction of the vehicle together with the center pillar 4, the impactor 52 easily deforms to collapse inward and downward in the width direction of the vehicle from the upper inclined section 52s as a starting point due to a reaction force received by the upper inclined section 52s from the lower inclined section 51s. Thus, it is possible to efficiently crush the crushing member 51 using the impactor 52. Therefore, it is possible to efficiently minimize an amount of deformation of the center pillar 4 by more effectively absorbing energy due to a collision load input to the center pillar 4.

In the embodiment, the crushing member 51 is joined to the upper surface 2t of the side sill 2 and the inner surface 2s in the width direction of the vehicle.

According to this constitution, the crushing member 51 is joined to the firm side sill 2. Thus, when a collision force from the side of the vehicle is input, if the crushing member 51 is pressed by the impactor 52 displaced inward in the width direction of the vehicle together with the center pillar 4, the upper portion of the crushing member 51 easily deforms to collapse inward and downward in the width direction of the vehicle while the lower portion of the crushing member 51 is prevented from collapsing. Therefore, it is possible to efficiently minimize an amount of deformation of the center pillar 4 by more effectively absorbing energy due to a collision load input to the center pillar 4.

In the embodiment, the center pillar 4 further includes the pillar inner 42 provided on the inside in the width direction of the vehicle with respect to the pillar outer 41 and having the lower end portion with the opening 42k therein and the crushing member 51 is disposed below the opening 42k and inward in the width direction of the vehicle.

According to this constitution, when the crushing member 51 is disposed further inward in the width direction of the vehicle than the pillar inner 42, it is possible to efficiently crush the crushing member 51 using the impactor 52 displaced inward in the width direction of the vehicle together with the center pillar 4.

In the embodiment, the impactor 52 includes the beads 52r which are continuous from the upper wall 52a to the pair of upper side walls 52b on both sides in the forward/rearward direction of the vehicle.

According to this constitution, it is possible to increase the strength of the impactor 52 using the beads 52r. Thus, it is possible to efficiently crush the crushing member 51 using the impactor 52. Therefore, it is possible to efficiently minimize an amount of deformation of the center pillar 4 by more effectively absorbing energy due to a collision load input to the center pillar 4.

In the embodiment, a constitution in which the front door beam 65 and the rear door beam 75 provided in the front door 61 and the rear door 71 provided in the front door opening 6 and the rear door opening 7 formed in at least one in the forward/rearward direction of the vehicle with respect to the center pillar 4 to be openable and closeable, and provided to straddle the front door 61 and the rear door 71 in the forward/rearward direction of the vehicle with the front door opening 6 and the rear door opening 7 closed are further provided and the beam ends 65e and 75e of the front door beam 65 and the rear door beam 75 in the forward/rearward direction of the vehicle are disposed at positions in which the beam ends 65e and 75e and the impactor 52 overlap in the upward/downward direction is provided.

According to this constitution, when the end portions of the front door beam 65 and the rear door beam 75 on the center pillar 4 side and the impactor 52 are disposed at positions in which the end portions and the impactor 52 overlap in the upward/downward direction, in the case in which a collision load is input from the side of the vehicle, it is possible to efficiently transmit forces transmitted from the front door 61 and the rear door 71 side to the center pillar 4 to the impactor 52. Therefore, it is possible to actively crush the crushing member 51 using the impactor 52. Thus, it is possible to efficiently minimize an amount of deformation of the center pillar 4 by more effectively absorbing energy due to a collision load input to the center pillar 4.

In the embodiment, the impactor 52 is constituted to have a rigidity higher than that of the crushing member 51.

According to this constitution, when a collision load is input from the side of the vehicle, it is possible to efficiently crush the crushing member 51 using the impactor 52 having a high rigidity. Thus, it is possible to efficiently minimize an amount of deformation of the center pillar 4 by more effectively absorb energy due to a collision load input to the center pillar 4.

In the embodiment, the impactor 52 is constituted to be made of a material having a sheet thickness larger than that of the crushing member 51.

According to this constitution, when the impactor 52 is made of a material having a sheet thickness larger than that of the crushing member 51, the impactor 52 has a rigidity higher than that of the crushing member 51. Thus, when a collision load is input from the side of the vehicle, it is possible to efficiently crush the crushing member 51 using the impactor 52 having a high rigidity. Therefore, it is possible to efficiently minimize an amount of deformation of the center pillar 4 by more effectively absorbing energy due to a collision load input to the center pillar 4.

Modified Example of Embodiment

In the vehicle body side structure 1 having the constitution as described above, as indicated by the alternate long and two short dashed line in FIG. 4, a partition wall 55 may be further provided inside the side sill 2. The partition wall 55 has a box shape or a sheet shape in which the partition wall 55 is provided along a surface of the side sill 2 which intersects the partition wall 55 in the forward/rearward direction of the vehicle. The partition wall 55 is joined to the inner surface of the side sill 2 through spot welding or the like. The partition wall 55 is provided at a position in which the partition wall 55 and the crushing member 51 overlap in the forward/rearward direction of the vehicle.

According to this constitution, it is possible to increase the strength of the side sill 2 in a portion in which the crushing member 51 is provided. Thus, in the case in which a collision load is input from the side of the vehicle, when the crushing member is pressed by the impactor 52 displaced inward in the width direction of the vehicle together with the center pillar 4, the upper portion of the crushing member 51 easily deforms to collapse inward and downward in the width direction of the vehicle while preventing the lower portion of the crushing member 51 from collapsing. Therefore, it is possible to efficiently minimize an amount of deformation of the center pillar 4 by more effectively absorbing energy due to a collision load input to the center pillar 4.

Other Modified Examples

Although the preferred embodiments according to the present invention have been described above, the present invention is not limited to these examples. Additions, omissions, replacements, and other changes of the constitution are possible without departing from the gist of the present invention. The present invention is not limited by the description described above and is limited only by the accompanying claims.

For example, although the lower portion of the crushing member 51 is joined to the inner surface 2s in the width direction of the vehicle and the upper surface 2t of the side sill 2 in the embodiment described above, the present invention is not limited to the constitution. The lower portion of the crushing member 51 may be inserted into the side sill 2 through the opening formed in the upper surface of the side sill 2.

Also, although the upper portion of the crushing member 51 is inserted into the lower portion of the impactor 52 in the embodiment described above, the present invention is not limited to the constitution. For example, the lower side wall 51b and the upper side wall 52b may be connected to partially overlap. Furthermore, the upper portion of the crushing member 51 and the lower portion of the impactor 52 may be brought into contact with each other.

In addition, although the bead 52r is provided in the impactor 52 as a reinforcing section in the embodiment described above, another structure may be appropriately adopted in place of the bead 52r if the impactor 52 can be reinforced. Furthermore, it is also possible to omit the bead 52r.

Moreover, although the winding device 100 is fixed to the side sill 2 using the anchor member 101 in a state of being accommodated in the accommodation concave section 52q formed in the impactor 52 in the embodiment described above, the present invention is not limited to the constitution. The winding device 100 may be fixed to the impactor 52 (for example, onto the upper bottom wall 52d) or may be fixed to the crushing member 51 if the winding device 100 is accommodated in the accommodation concave section 52q.

Also, although the crushing member 51 and the impactor 52 are provided on the center pillar 4 in the embodiment described above, the crushing member 51 and the impactor 52 may be provided on the front pillar 3 or the quarter pillar (not shown) without being limited to center pillar 4.

In addition, it is possible to replace the constituent elements in the embodiment described above with well-known constituent elements as appropriate without departing from the spirit of the present invention and the modified examples described above may be appropriately combined.

What is claimed is:

1. A vehicle body side structure, comprising:
   side sills provided at both end portions of a floor section in a width direction of a vehicle and extending in a forward/rearward direction of the vehicle;
   a pillar extending upward from each of the side sills and having a pillar outer provided on an outside in the width direction of the vehicle;
   a crushing member provided on an inside in the width direction of the vehicle with respect to the pillar outer, having a lower portion joined to the side sill, and extending upward;
   an impactor which is provided above the crushing member, which is joined to an inside of the pillar outer in the width direction of the vehicle, and in which the impactor and the crushing member at least partially overlap in an upward/downward direction; and
   a seatbelt winding device provided on the outside in the width direction of the vehicle with respect to the crushing member and disposed inside an accommodation concave section formed in the impactor.

2. The vehicle body side structure according to claim 1, wherein the impactor includes an upper wall fixed to the pillar outer,
   a pair of upper side walls extending inward in the width direction of the vehicle from both end portions of the upper wall in the forward/rearward direction of the vehicle, and
      an upper bottom wall configured to close below the pair of upper side walls, and is opened inward in the width direction of the vehicle,
   the crushing member includes a lower wall disposed at a distance inward in the width direction of the vehicle with respect to the pillar outer, and
   a pair of lower side walls extending outward in the width direction of the vehicle from both sides of the lower wall in the forward/rearward direction of the vehicle, and
   is opened outward in the width direction of the vehicle, and
   the pair of upper side walls and the pair of lower side walls are joined.

3. The vehicle body side structure according to claim 2, wherein each of the lower side walls includes a lower inclined section inclined upward from the outside toward the inside in the width direction of the vehicle, and
   the upper side wall includes an upper inclined section inclined upward from the outside toward the inside in the width direction of the vehicle and connected to the lower inclined section.

4. The vehicle body side structure according to claim 2, wherein the impactor includes reinforcing sections which are continuous from the upper wall to the pair of upper side walls on both sides in the forward/rearward direction of the vehicle.

5. The vehicle body side structure according to claim 1, wherein the crushing member is joined to an inner surface in the width direction of the vehicle and an upper surface of the side sill.

6. The vehicle body side structure according to claim 1, wherein the pillar further includes a pillar inner provided inward in the width direction of the vehicle with respect to the pillar outer and having a lower end portion with an opening therein, and
   the crushing member is disposed below the opening and inward in the width direction of the vehicle.

7. The vehicle body side structure according to claim 1, further comprising:
   a partition wall provided inside the side sill and at a position in which the partition wall and the crushing member overlap in the forward/rearward direction of the vehicle along a surface of the side sill which intersects the partition wall in the forward/rearward direction of the vehicle.

8. The vehicle body side structure according to claim 1, further comprising:
   a door beam provided in a door provided in a door opening formed on at least one side in the forward/rearward direction of the vehicle to be openable and closeable with respect to the pillar and provided to straddle the door opening in the forward/rearward direction of the vehicle with the door opening closed, and
   a beam end of the door beam is disposed at a position in which the beam end and the impactor overlap in the upward/downward direction.

9. The vehicle body side structure according to claim 1, wherein the impactor has a rigidity higher than that of the crushing member.

10. The vehicle body side structure according to claim 9, wherein the impactor is made of a material having a sheet thickness larger than that of the crushing member.

* * * * *